US009896217B2

(12) United States Patent
Nakhjavani et al.

(10) Patent No.: US 9,896,217 B2
(45) Date of Patent: Feb. 20, 2018

(54) ENHANCED PERFORMANCE JET ENGINE MOUNTING STRUTS

(71) Applicant: The Boeing Company, Chicago, IL (US)

(72) Inventors: Omid B. Nakhjavani, Mukilteo, WA (US); Robert H. Willie, Bothell, WA (US); Paul S. Park, Bellevue, WA (US); Mohammad Ali Heidari, Bellevue, WA (US); Leonard J. Hebert, Kirkland, WA (US); Milan Stefanovic, Everett, WA (US); Parminder Singh, Lynnwood, WA (US); Naimishkumar B. Harpal, Everett, WA (US); Andrew Y. Na, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 92 days.

(21) Appl. No.: 14/990,697

(22) Filed: Jan. 7, 2016

(65) Prior Publication Data

US 2017/0197723 A1    Jul. 13, 2017

(51) Int. Cl.
*B64D 27/18* (2006.01)
*B64D 27/26* (2006.01)

(52) U.S. Cl.
CPC ............. *B64D 27/18* (2013.01); *B64D 27/26* (2013.01); *B64D 2027/264* (2013.01)

(58) Field of Classification Search
CPC ... B64D 27/18; B64D 27/26; B64D 2027/264
See application file for complete search history.

(56) References Cited

U.S. PATENT DOCUMENTS

| 6,394,389 B1* | 5/2002 | Saiz ......................... B64C 7/02 244/91 |
| 8,191,823 B2* | 6/2012 | Guering .................. B64C 15/12 244/54 |
| 8,353,476 B2* | 1/2013 | Crook .................... B64D 27/18 244/123.4 |
| 8,727,269 B2* | 5/2014 | Stuart ....................... F02C 7/20 244/53 R |
| 9,027,875 B2* | 5/2015 | West ..................... B64C 1/1453 244/53 R |
| 9,248,921 B2* | 2/2016 | West ...................... B64D 27/18 |
| 2005/0274485 A1 | 12/2005 | Huggins et al. |

(Continued)

FOREIGN PATENT DOCUMENTS

EP    1 852 346 A1    11/2007

*Primary Examiner* — Philip J Bonzell
*Assistant Examiner* — Michael B Kreiner
(74) *Attorney, Agent, or Firm* — Haynes and Boone, LLP (57) ABSTRACT

In one example embodiment, a strut for mounting a jet engine to a wing of an aircraft includes a plurality of engine mounts and a space frame truss supported from the wing and comprising front and aft portions, the front portion being coupled to and supporting the engine mounts, the aft portion extending upwardly and rearwardly from an aft end of the front portion. By removing the aft end of the strut from the core exhaust zone of the engine, substantial reductions in the weight and drag of the strut, and a corresponding increase in the specific fuel consumption of the associated aircraft may be achieved.

18 Claims, 12 Drawing Sheets

(56) References Cited

U.S. PATENT DOCUMENTS

| | | |
|---|---|---|
| 2009/0212155 A1 | 8/2009 | Huggins et al. |
| 2010/0147996 A1 | 6/2010 | Hartshorn et al. |
| 2011/0121132 A1 | 5/2011 | Crook et al. |
| 2012/0056033 A1 | 3/2012 | Teulou et al. |
| 2012/0305700 A1 | 12/2012 | Stuart et al. |
| 2015/0197341 A1* | 7/2015 | Ewens .................. B64D 27/26 244/54 |
| 2015/0251768 A1 | 9/2015 | Woolley et al. |
| 2016/0159487 A1* | 6/2016 | Kang .................... B64D 27/18 244/54 |

* cited by examiner

ENHANCED PERFORMANCE JET ENGINE MOUNTING STRUTS

BACKGROUND

Technical Field

This application relates to the design of jet engine mounting pylons, or struts, that provide enhanced aerodynamic and fuel consumption performance.

Related Art

Most of today's commercial jet airliners are powered by high-bypass turbofan jet engines. The exhaust of these engines is divided into two concentric "zones," viz., an outer, relatively high-rate-of-flow, low-velocity-and-temperature, "fan exhaust" zone, and an inner, relatively low-rate-of-flow, high-velocity-and-temperature, "core exhaust" zone.

The mounting pylon of each engine couples the engine to the aircraft's wing and typically comprises a structural component, or "strut," encased within a streamlining skin, or "fairing." It is typically located at least partially within the "Hot-Zone," i.e., the core exhaust, of the associated engine, which necessitates the presence of heat shields over the strut in this area to prevent heat degradation of the strut. Further, since air speeds in the core exhaust area are supersonic, the resulting parasitic drag imposed on the strut in this zone is relatively severe. Along with increased drag, there is additional mass associated with both the heat shields needed to insulate the wing from the hot core exhaust gases, as well as the extended aft fairings of the strut.

Accordingly, there is a long felt but as yet unsatisfied need in the industry for jet engine mounting strut designs that eliminate the requirement for strut exhaust shields in the core exhaust nozzle zone, and which reduce the drag and attendant fuel consumption associated with the strut aft fairings.

SUMMARY

In accordance with embodiments of the present disclosure, novel jet engine mounting struts are provided that eliminate the requirement for strut exhaust shields in the core exhaust nozzle zone of the engine and that reduce the drag and attendant fuel consumption associated with the fairings at the aft end of the strut.

In one example embodiment, a strut for mounting a jet engine to a wing of an aircraft comprises a plurality of engine mounts and a space frame truss supported from the wing and comprising front and aft portions. The front portion is coupled to and supports the engine through the engine mounts, and the aft portion extends upwardly and rearwardly from an aft end of the front portion.

In another example embodiment, a method for mounting an engine to a wing of an aircraft comprises supporting a space frame truss from the wing and coupling the engine to a plurality of engine mounts, wherein the truss comprises front and aft portions, the front portion having the plurality of engine mounts dependent therefrom, and the aft portion extending upwardly and rearwardly from an aft end of the front portion.

In yet another example embodiment, an aircraft comprises a fuselage, a wing coupled to the fuselage, an engine mounting strut supported from the wing, and a jet engine supported from the strut, wherein no part of an aft portion of the strut is disposed within a core exhaust zone of the engine.

The scope of the invention is defined by the claims, which are incorporated into this section by reference. A better understanding of the enhanced performance jet engine mounting struts and methods for their design and use of the present disclosure, as well as an appreciation of the above and additional advantages thereof, will be afforded to those of skill in the art by a consideration of the following detailed description of one or more example embodiments thereof. In this description, reference is made to the various views of the appended sheets of drawings, which are briefly described below, and within which like reference numerals are used to identify like ones of the elements illustrated therein.

DETAILED DESCRIPTION

In some commercial and jet aircraft, the aft end of the engine strut of each engine, which couples the engine to the aircraft's wing, is located within the "Hot-Zone," i.e., the core exhaust, of the associated engine, which necessitates the installation of heat shields over the strut in this area to prevent impermissible degradation of the strut from exhaust heat. Further, since air speeds in the core exhaust area are supersonic, the resulting drag impact on the aft strut fairing is relatively high. Along with drag, there is additional mass associated with the heat shields, and more specifically, those of the aft fairings of the strut, to insulate the strut and wing from the hot core exhaust gases. The updated design space provided by the present disclosure eliminates the requirement for exhaust shields in the core exhaust nozzle zone. Additionally, the new strut design reduces the drag and fuel usage associated with the aft strut fairing.

Therefore, an important objective of this invention is to remove the engine strut aerodynamic structures, i.e., the strut fairings and heat shields, from the hot-zone or core exhaust of the associated jet engine. To achieve this, the strut structure is redesigned to accommodate the changes within the available space.

The optimized aft end of the strut is fitted into the space defined by the aerodynamic and structural requirements of the strut. In one embodiment, the new design can comprise retaining the baseline structure design from the front of the strut up to a location just aft of an aft engine mount, and redesigning an aft strut mounting link to comprise an upwardly and rearwardly extending "torque box" structure, with suitable modifications to the other links that couple the strut to the associated wing structure.

Figure 1:
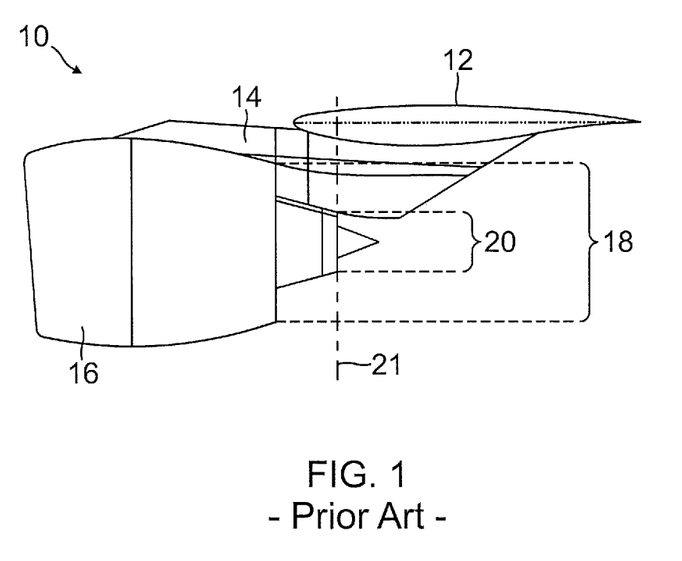
FIG. 1 is a partial left side elevation view of turbofan jet engine mounted on a wing of an aircraft by a conventional jet engine mounting strut.

FIG. 1 is a partial left side elevation view of turbofan jet engine 10 mounted on an associated wing 12 of an aircraft by a jet engine mounting pylon or strut 14 consistent with the prior art. The jet engine can comprise a turbofan engine, e.g., a high-bypass turbofan engine, and can be enclosed within a nacelle 16 for streamlining purposes. As discussed above, the exhaust of these engines is divided into two concentric zones, viz., an outer, relatively high-rate-of-flow, but relatively low-velocity-and-temperature "fan exhaust" zone 18, and an inner, relatively low-rate-of-flow, but relatively high-velocity-and-temperature "core exhaust" zone 20 that extends rearwardly and perpendicularly from a "core exit plane" 21.

Because an aft end portion of the strut 14 is located within the "Hot-Zone," i.e., the core exhaust 20 of the associated engine 10, it is necessary to provide heat shields over the strut 14 in the exposed area to prevent heat degradation of the strut 14. Additionally, since the exhaust gas speeds in this area are supersonic, the resulting parasitic drag imposed on the strut 14 in this zone is substantially higher than elsewhere on the strut 14. Further, along with increased drag, there is additional mass associated with both the heat shields needed to insulate the strut 14 and wing 12 from the hot core exhaust gases, as well as with the extended aft fairings of the strut 14. Thus, if the overall length of the strut 14 is shortened, and in particular, if the aft end of the strut 14 is removed from the core exhaust zone 20, then the heat shields can be eliminated, and the overall length of the strut fairing can be reduced. This results in substantial reductions in the weight and drag of the strut 14, and a corresponding increase in the Specific Fuel Consumption (SFC) of the associated aircraft.

Figure 2:
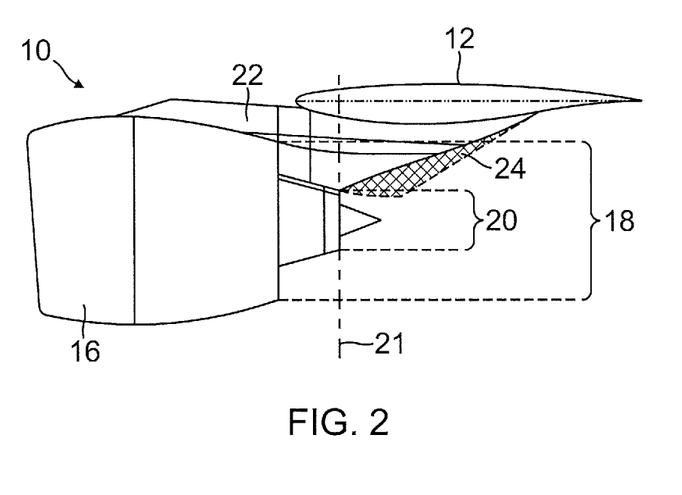
FIG. 2 is a partial left side elevation view of the turbofan jet engine of FIG. 1 mounted on the wing by an example embodiment of a jet engine mounting strut in accordance with the present disclosure.

FIG. 2 is a partial left side elevation view of the turbofan jet engine 10 of FIG. 1 mounted on the aircraft wing 12 by an example embodiment of a jet engine mounting strut 22 in accordance with the present disclosure. In particular, as illustrated in FIG. 2, a portion 24 of the strut 22, indicated by the cross-hatched area, including a portion previously shown in FIG. 1 as disposed within the Hot zone 20 of the engine 10, has been eliminated so as to achieve the above-described efficiencies and benefits in weight, cost, drag and SFC. As discussed in more detail below, an approach to achieving these goals can begin with an analysis of the structural and aerodynamic requirements of the engine mounting strut 22 and a redesign of its underlying structure so as to fit within the space defined by these requirements.

Figures 3A, 3B:
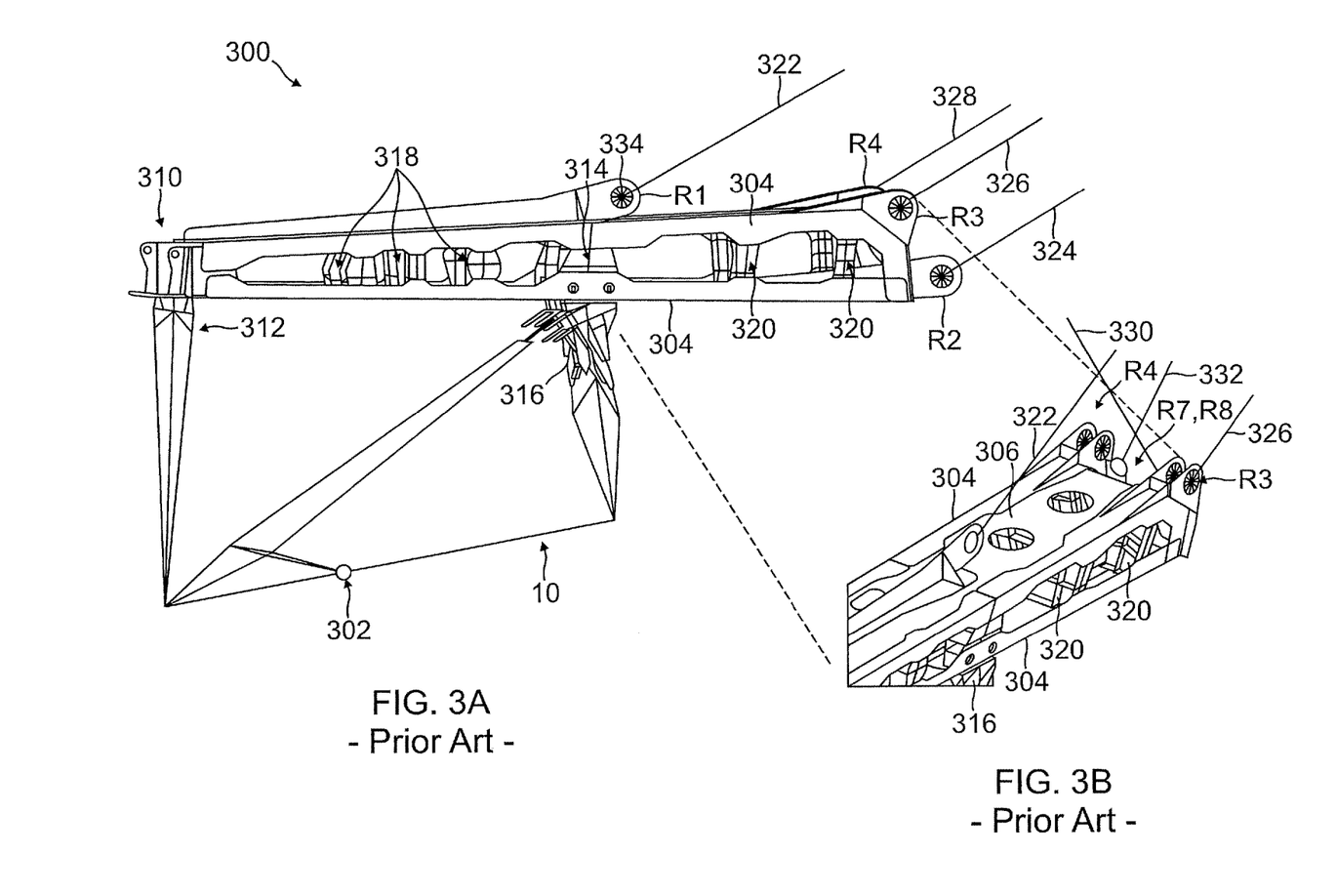
FIG. 3A is a left side elevation view of a space frame truss of a conventional jet engine mounting strut of a type used to mount the turbofan engine of FIG. 1 to the wing; in which the engine is replaced by a plurality of rigid links acting through the center of gravity (CG) of the engine, and the aerodynamic fairings and heat shields of the strut have been omitted to reveal the underlying space frame truss structure thereof.
FIG. 3B is a partial upper and left side perspective detail view of an aft end portion of the truss of the conventional engine mounting strut of FIG. 3A.

FIG. 3A is a left side elevation view of the underlying structure of the conventional strut 14, viz., a "space frame," or three-dimensional (3D) "torque box," or truss 300, of the conventional jet engine mounting strut 14 used to mount the turbofan engine 10 of FIG. 1 to the wing 12 of the aircraft, in which, for purposes of illustration, the engine 10 has been replaced by a plurality of rigid "links" through which engine loads acting through the center of gravity (CG) 302 of the engine 10 are reacted by the truss 300 through to the aircraft's wing structure, and in which the streamlining aerodynamic fairings and heat shields of the strut 14 have been omitted to reveal the underlying structure of the truss 300. FIG. 3B is a partial upper and left side perspective detail view of the aft end portion of the truss 300 of FIG. 3A. As can be seen in these figures, the truss 300 comprises an elongated box-like structure comprising four L-shaped corner members 304, upper and lower pairs of which are coupled together horizontally with respective ones of a pair of webs 306 (see FIG. 3B). In FIGS. 3A and 3B, a pair of opposite side webs 308 (see FIG. 7) that couple the upper and lower pairs of the corner members 304 to each other vertically have been omitted to reveal the underlying components of the truss 300.

As illustrated in FIG. 3A, a front engine mounting bulkhead 310 is disposed at the front end of the 3D truss 300, and has a front engine mount 312 dependent from it. The upper front end of the engine 10 couples to and is supported by the front engine mount 312. Similarly, an aft engine mount bulkhead 314 is disposed rearward of the front engine mount bulkhead 310, and has an aft engine mount 316 dependent from it. The upper aft end of the engine 10 is coupled to and is supported by the aft engine mount 316. The front engine mount 310 is one of two main attachments to the engine 10. It transmits vertical and lateral (side) loads to the torque box of the truss 300 via four tension bolts and a single shear pin. The aft engine mount 316 is the other one of the two main attachments to the engine 10. It is designed to take the fore-and-aft and side shear loads in a single shear pin. The down load and roll moment of the engine 10 are reacted in a plurality of tension bolts.

In the particular example embodiment illustrated in FIGS. 3A and 3B, a first plurality, viz., three, of longitudinally spaced, rectangular, transverse frames 318, respectively referred to herein as frames 1, 2 and 3, are interposed intermediate the front and aft engine mounting bulkheads 310 and 314, and a second plurality, viz., two, of longitudinally spaced transverse frames 320, respectively referred to herein as frames 4 and 5, are disposed between the aft engine mount bulkhead 316 and the aft end of the truss 300. The number of frames 318 and 320 utilized can vary, depending on the particular application at hand, and are used to maintain the contour of the strut 14 and to frame cutouts in the horizontal and vertical spar webs 306 and 308. They provide a bending load path for the skin and web panels. Some of the frames 318 and 320 can also provide support to a "core service" disconnect or thrust reverser hinges of the engine 10. Some can also provide a barrier to a so-called "wet bay" disposed within the strut 14 for system hydraulic and fuel lines, and additionally or alternatively, can serve as a bulkhead separating pressured and sealed bays of the truss 300.

As can be seen in FIGS. 3A and 3B, the conventional truss 300 is provided with a plurality of fittings for coupling the truss 300, and hence, the engine 10 dependent from it, to the structure of the aircraft's wing 12. These fittings comprise an R1 fitting disposed at the middle of the truss 300, above and slightly aft of the aft engine bulkhead 316, an R2 fitting disposed at the middle of the lower, aft end of the truss 300, a pair of spaced-apart fittings R3 and R4 respectively disposed at the upper left and right corners of the aft end of the truss 300, and a pair of spaced-apart fittings R7 and R8 respectively disposed at the lower corners of the aft end of the truss 300 and angled away from each other at a selected included angle of about 45 degrees. As above, the number and location of the attachment fittings R1-R8 can vary, depending on the application. Additionally, although the fittings are illustrated a simple lug-type fittings, other known types of fittings, e.g., ball-and-socket fittings, can also be used instead or addition to the former.

Corresponding "links," i.e., rigid, elongated rods or beam-like structures, capable of carrying tension, compression, torsion and lateral bending, and having an appropriate connection fitting disposed at the opposite ends thereof, are used to couple each fitting to an associated complementary fitting disposed on or within the structure of the wing 12. In the particular example embodiment of FIGS. 3A and 3B, the links that couple the truss 300 to the wing structure comprise an R1 link 322 coupled to the R1 fitting, an R2 link 324 coupled to the R2 fitting, R3 and R4 links 326 and 328 respectively coupled to the R3 and R4 fittings, and R7 and R8 links 330 and 332 respectively coupled to the R7 and R8 fittings.

The R1 fitting is one of four primary load paths reacting engine loads from the two engine mounts 312 and 316 into the wing 12. The R1 fitting is connected to the wing 12 by the R1 link 322 and includes a bifurcated fitting (not illustrated) at its front end that provides a double shear joint with the lug of the R1 fitting via a fuse pin 334 extending commonly through the two fittings. The R2 fitting is another one of the four primary load paths to the wing 12. It is connected to the wing 12 by a diagonal R2 brace or link 324, and is the primary load path for transferring engine thrust into the wing 12. The R3 and R4 fittings are the other two of the four primary attachment points of the truss 300 to the wing 12. They couple the truss 300 to the mid-spar structure of the wing 12 through the R3 and R4 links 326 and 328. The R3 and R4 fittings react loads in the lateral direction, as well as in yaw, roll and pitch. All side loads are carried by the secondary R7 and R8 lugs and their associated R7 and R8 links 330 and 332.

To provide a "best," or optimized redesign of the truss 300 to achieve the desired objectives, a design approach is taken that maintains the existing design of the truss 300 from the front of the strut 14 up to the first of the two aftermost transverse frames 320, i.e., up to frame 4 located immediately aft of the aft engine mount 316, and redesigns the R2 fitting and link 324 to comprise an upwardly and rearwardly extending "torque box" structure, with suitable modifications to the other fittings R1, R3, R4, R7 and R8 and corresponding links 322, 326, 328, 330 and 332, that couple the modified strut to the existing wing mounting structures.

Figure 4:
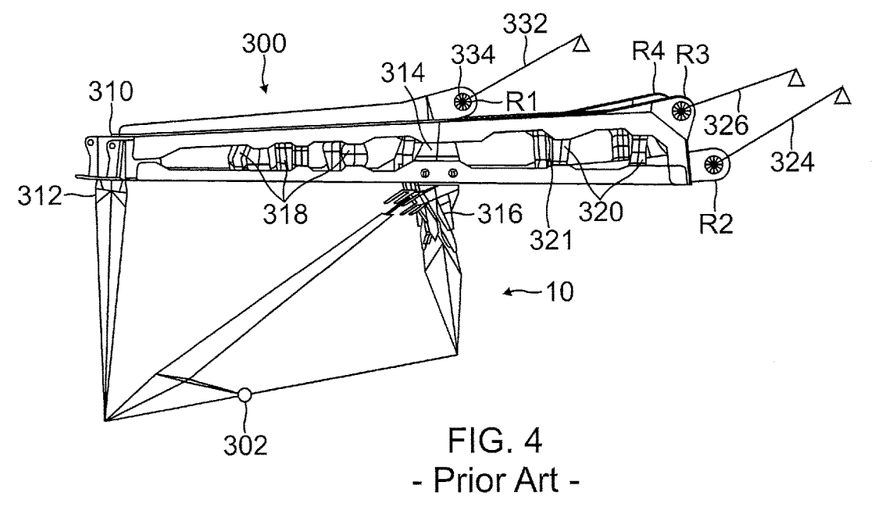
FIG. 4 is another left side elevation view of the truss of the conventional engine mounting strut before being redesigned in accordance with the present disclosure.
Figure 5:
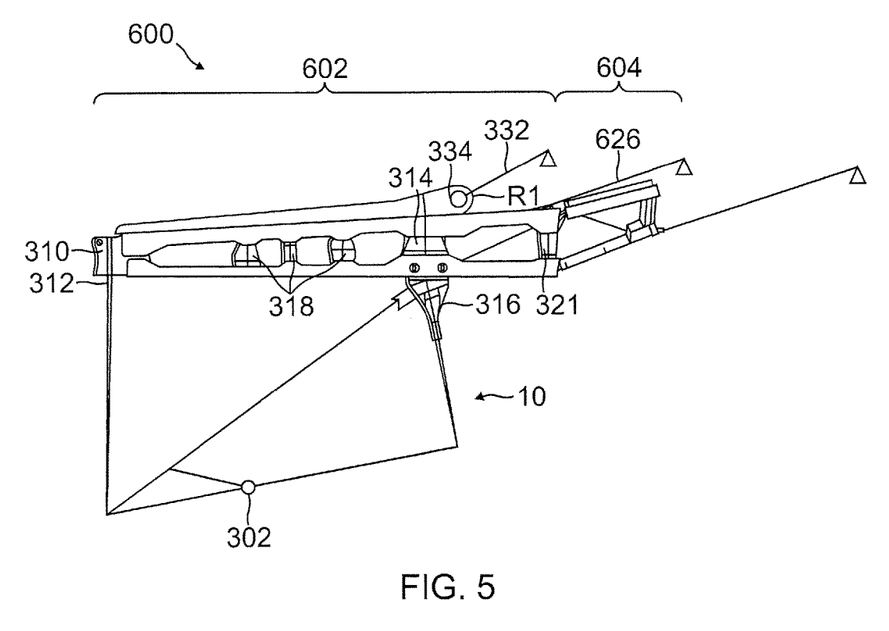
FIG. 5 is a left side elevation view of an example embodiment of the truss of the engine mounting strut after it has been redesigned in accordance with the present disclosure.

FIG. 4 is a left side elevation view of the truss 300 of the conventional engine mounting strut 14 similar to FIG. 3A, before the aft end is redesigned in accordance with the foregoing procedure, and FIG. 5 is a left side elevation view of an example embodiment of the truss 600 of the engine mounting strut 22 of FIG. 2, after it has been redesigned in accordance with the present disclosure. As can be seen in a comparison of FIGS. 4 and 5, the redesigned space frame truss 600 of the redesigned strut 22 comprises a front portion 602 and an aft portion 604 that is coupled to the front portion 602 and extends upwardly and rearwardly therefrom.

As discussed above, the front portion 602 is substantially identical to the conventional truss 300 from the front end thereof, up to the fourth transverse frame 321, and the aft portion 604 extends upwardly and rearwardly from an aft end of the front portion 602 such that, when the redesigned strut fairing is attached to the truss 600, no part of the aft portion of the strut 22 is disposed within the core exhaust zone 20 of the engine 10, as illustrated in FIG. 1. In particular, the aft portion 604 extends upwardly and rearwardly from a transverse plane of the truss 600 that is substantially coplanar with the core exit plane 21 of the engine 10.

Thus, in the example redesigned truss 600, the front engine mounting bulkhead 310, front engine mount 312, aft engine mount bulkhead 314, aft engine mount 316, the first plurality successive rectangular, transverse frames 318, and the first one 321 of the two successive transverse frames 320, i.e., the fourth transverse frame 321, remain substantially the same as in the conventional truss 300, the result of which is that at least the mounting of the engine 10 to the redesigned truss 600 remains substantially the same.

Figure 6:
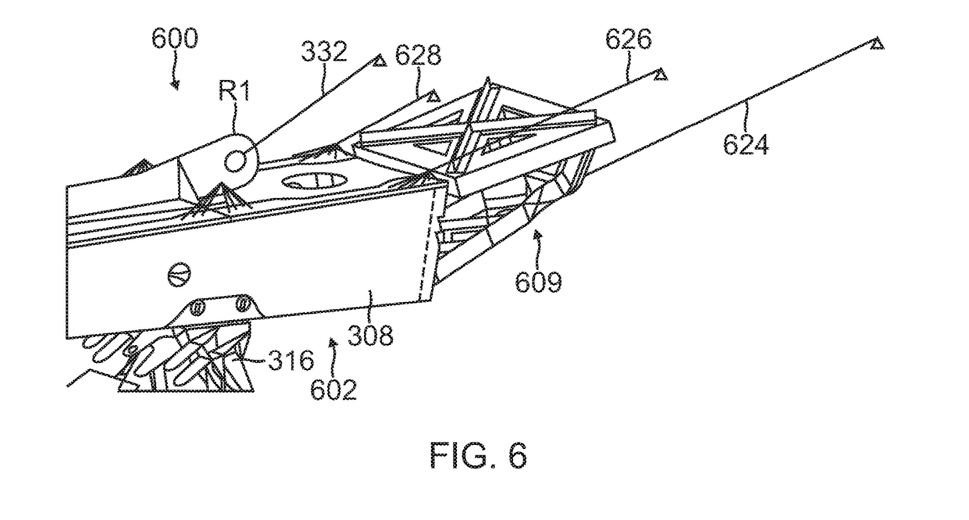
FIG. 6 is a partial upper left side perspective view of the example redesigned strut truss, showing a plurality of reconfigured aft-end mounting links thereof.

As discussed above, the mounting of the redesigned truss 600 to the existing structure of the wing 12 entails the modification of the fittings and links extending between the truss 600 and the wing structure. FIG. 6 is a partial upper left side perspective view of the example redesigned truss 600, showing the reconfigured aft-end mounting links thereof. As can be seen in FIGS. 5 and 6, the R1 fitting and associated link 332 remain unaffected by the redesign. The R2 fitting and associated link 324 are replaced by a shortened R2 or diagonal link 624. The links 326 and 328 respectively associated with the R3 and R4 fittings are replaced by a pair of elongated links 626 and 628 that couple to the aft end of the front portion 602 of the truss 600 immediately above the transverse frame 321, and which serve to take out the side loads formerly borne by the R7 and R8 fittings and links 330 and 332, which are eliminated in the new design.

Figure 7:
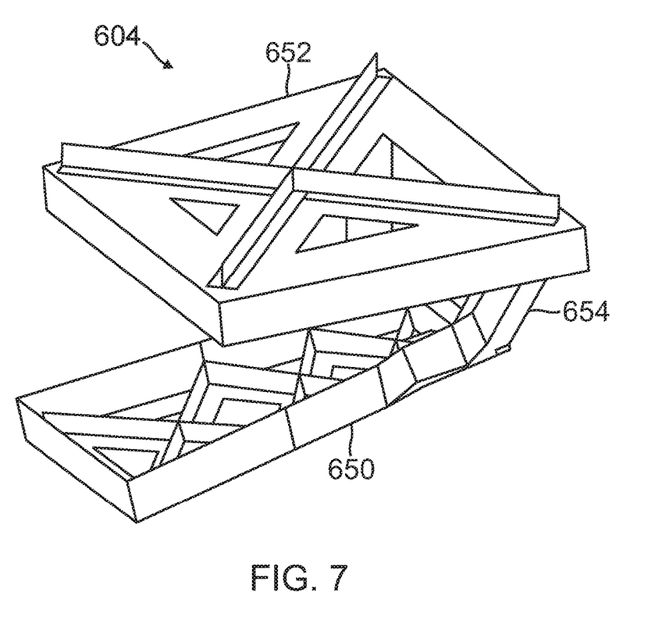
FIG. 7 is an upper left side perspective view of an example embodiment of an aft end portion of the redesigned truss in accordance with the present disclosure.

FIG. 7 is an upper left side perspective view of the aft end portion 604 of the redesigned truss 600. As can be seen in FIG. 7, the aft portion 604 of the new truss 600 comprises a lower, generally rectangular frame 650 having a diagonally oriented lattice-like structure and an aft end, a generally rectangular upper frame 652 also having a diagonally oriented lattice-like structure and an aft end, and a generally U-shaped aft frame 654 disposed at an aft end of the aft portion 604 of the truss 600, and which couples the aft end of the lower frame 650 to the aft end of the upper frame 652. In the particular example embodiment illustrated in FIG. 7, the lateral width of the lower frame 650 is less than the width of the upper frame 652, and the two sides of the lower frame 650 taper inwardly toward its aft end, whereas, the two sides of the upper frame 652 remain generally parallel to each other.

Figures 8, 9:
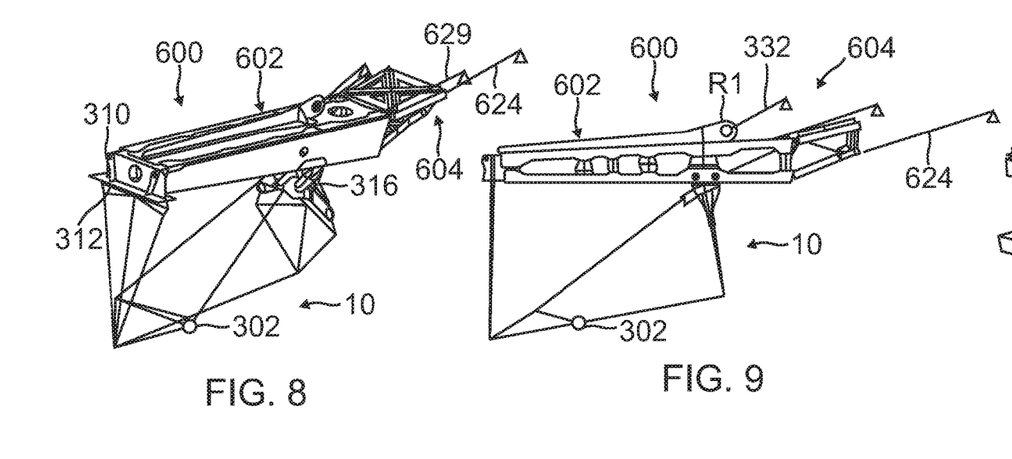
FIGS. 8-10 are upper left side perspective, left-side elevation, and upper left side perspective views of the example redesigned truss and aft end portion thereof, respectively.
Figure 10:
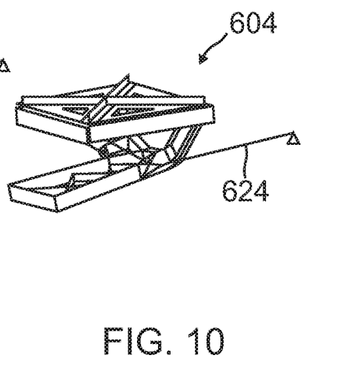

FIGS. 8-10 are upper left side perspective, left-side elevation, and upper left side perspective views of the example redesigned truss 600 and aft end portion 604 thereof, respectively, and FIGS. 11A-11E are various perspective views of example embodiments of structural components of the redesigned aft end portion 604 of the redesigned truss 600, in accordance with the present disclosure.

Figure 11A:
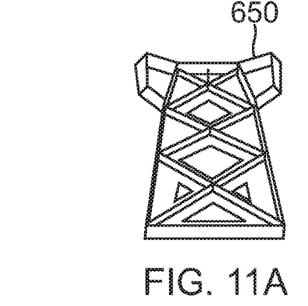
FIGS. 11A-11E are partial perspective views of example embodiments of structural components of the redesigned aft end portion of the truss in accordance with the present disclosure.
Figure 11B:
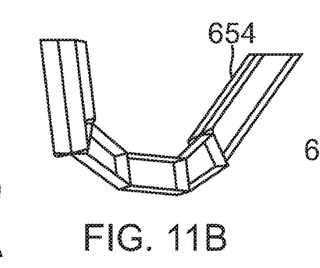
Figure 11C:
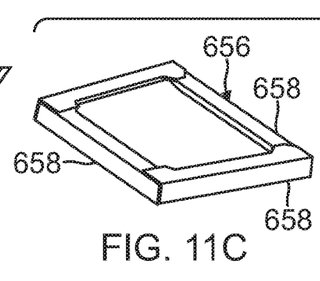
Figure 11D:
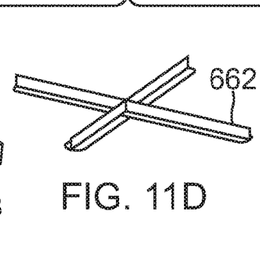
Figure 11E:
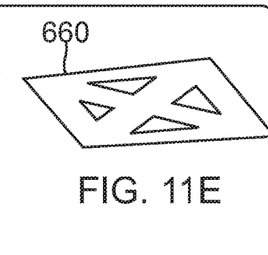

As can be seen in FIGS. 11C-11D, in one of only many possible embodiments, the upper frame 652 can comprise a lower, generally rectangular frame 656 comprising four chords 658 coupled end-to-end at the corners of the frame 656, an upper skin 660 defining an X-shaped pattern extending between diagonal corners of the frame 656 and disposed on an upper surface thereof, and a pair of stiffeners 662, each of which can have a T-shaped cross-section, disposed on an upper surface of the skin 660 and forming a cross extending between the diagonal corners of the frame 656.

Figure 12:
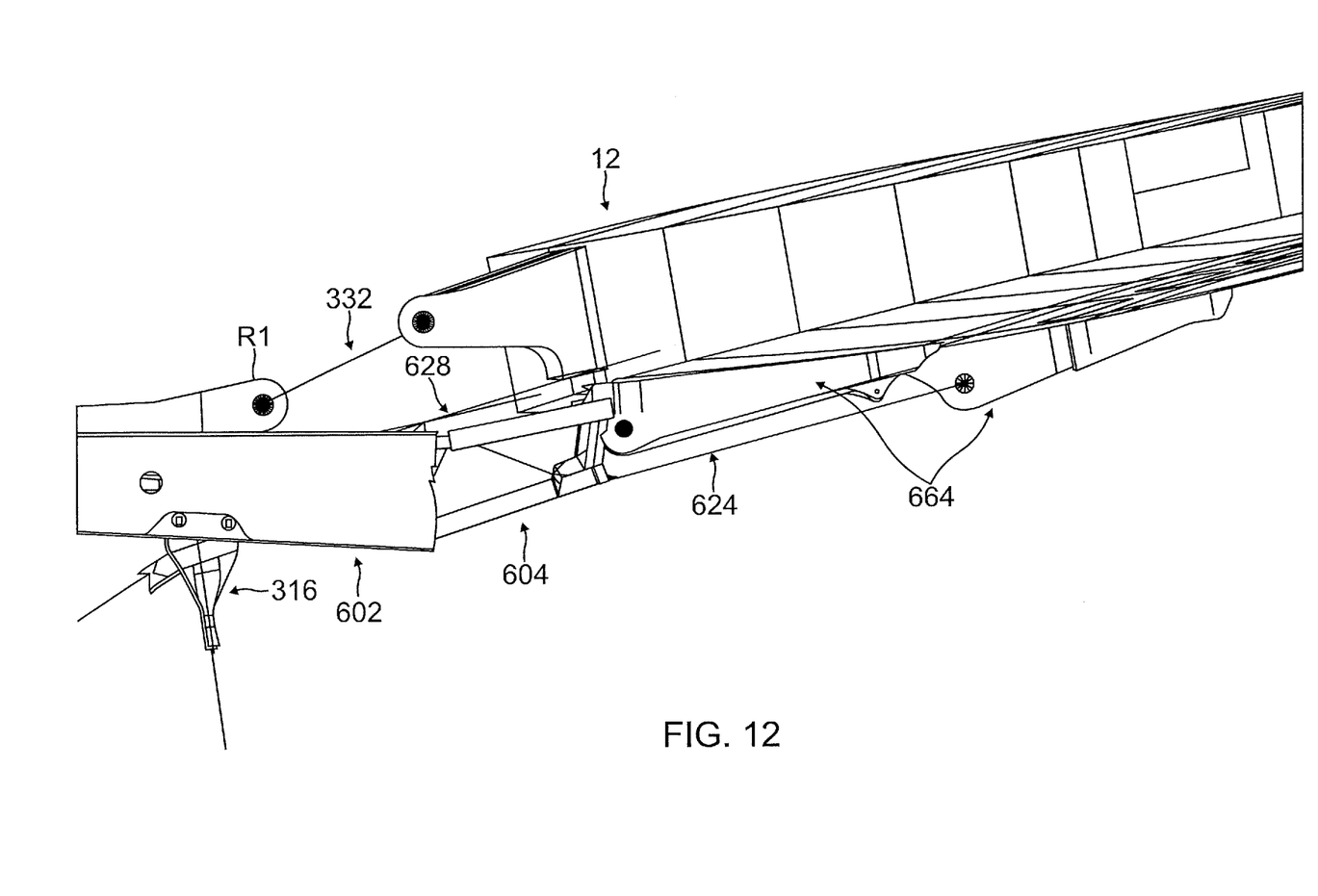
FIG. 12 is a partial left side elevation and cross-sectional view of the example engine mounting strut shown coupled to a leading edge and lower surface of a wing of an aircraft.

FIG. 12 is a partial left side elevation and cross-sectional view of the example engine mounting strut 22 of FIG. 2 in which the streamlining fairing has been omitted to reveal the redesigned truss 600, and shown coupled to the existing attachment fittings 664 of the wing 12 of an aircraft.

Figure 13:
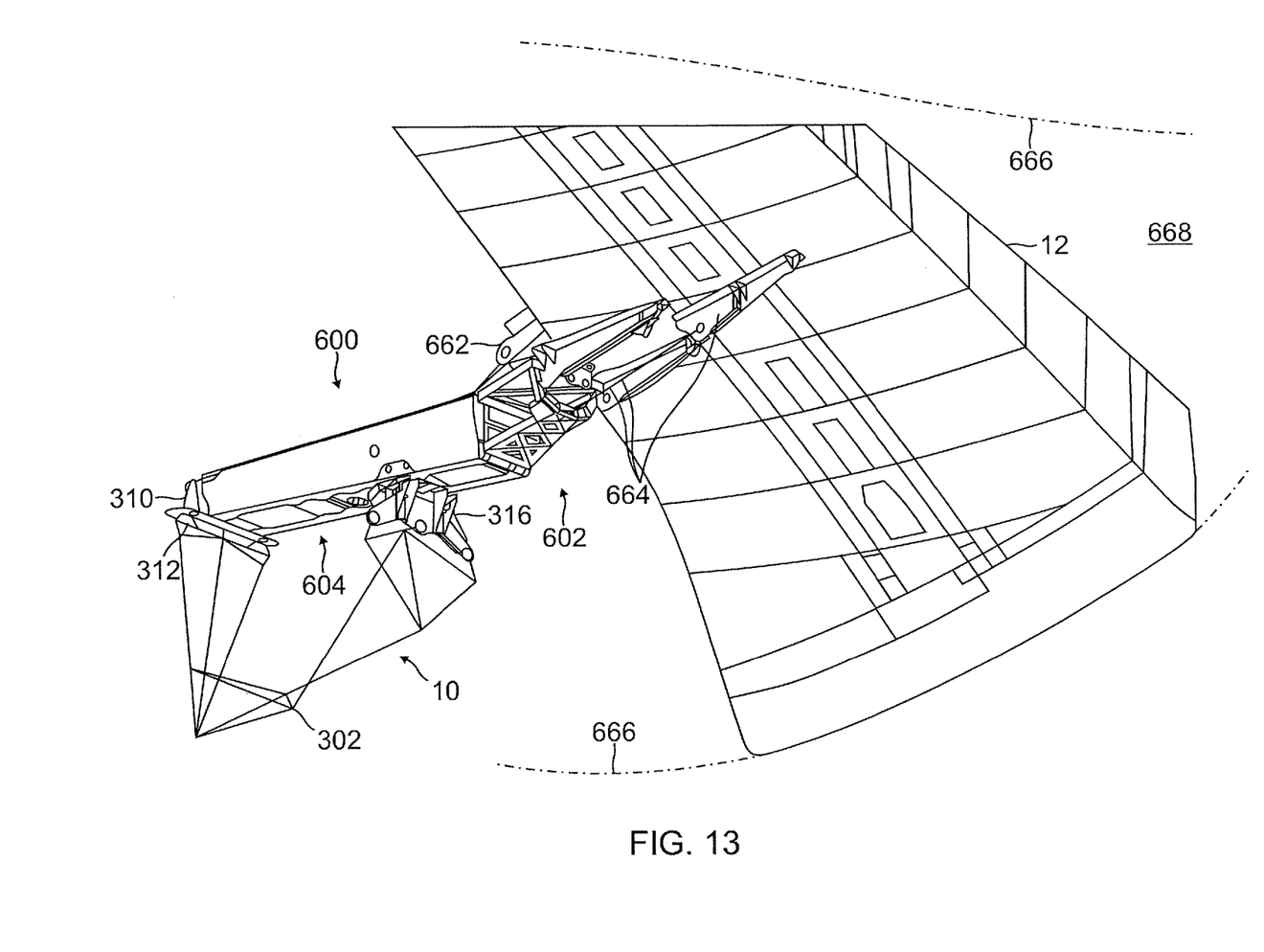
FIG. 13 is a partial lower left side perspective and cross-sectional view of the example engine mounting strut shown coupled to a wing attached to a fuselage of an aircraft.
Figure 14:
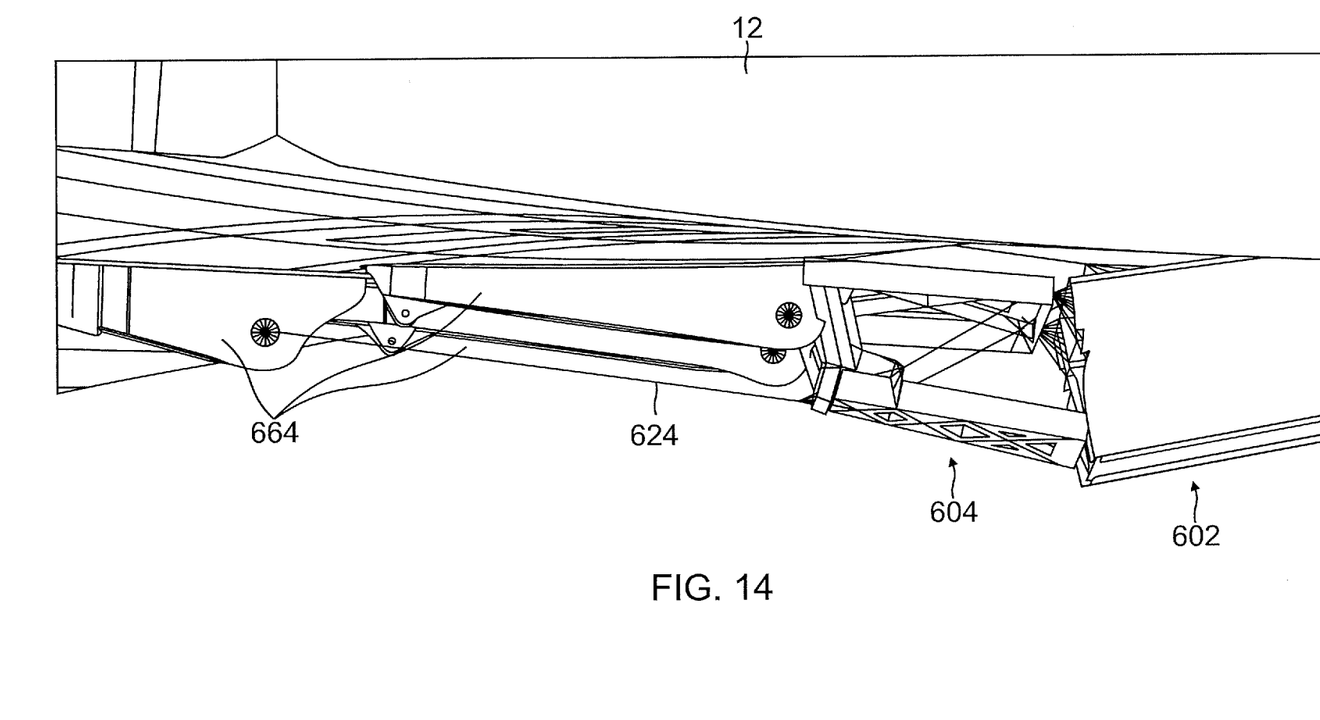
FIG. 14 is a partial right side elevation and cross-sectional view of the example engine mounting strut.

FIG. 13 is a partial lower left side perspective and cross-sectional view of the truss 300 of the example engine mounting strut 22, shown mounted to a wing 12 that is coupled to a fuselage 666 of an associated aircraft 668. FIG. 14 is a partial right side elevation and cross-sectional view of the example truss 600 of the novel engine mounting strut 22.

Figure 15:
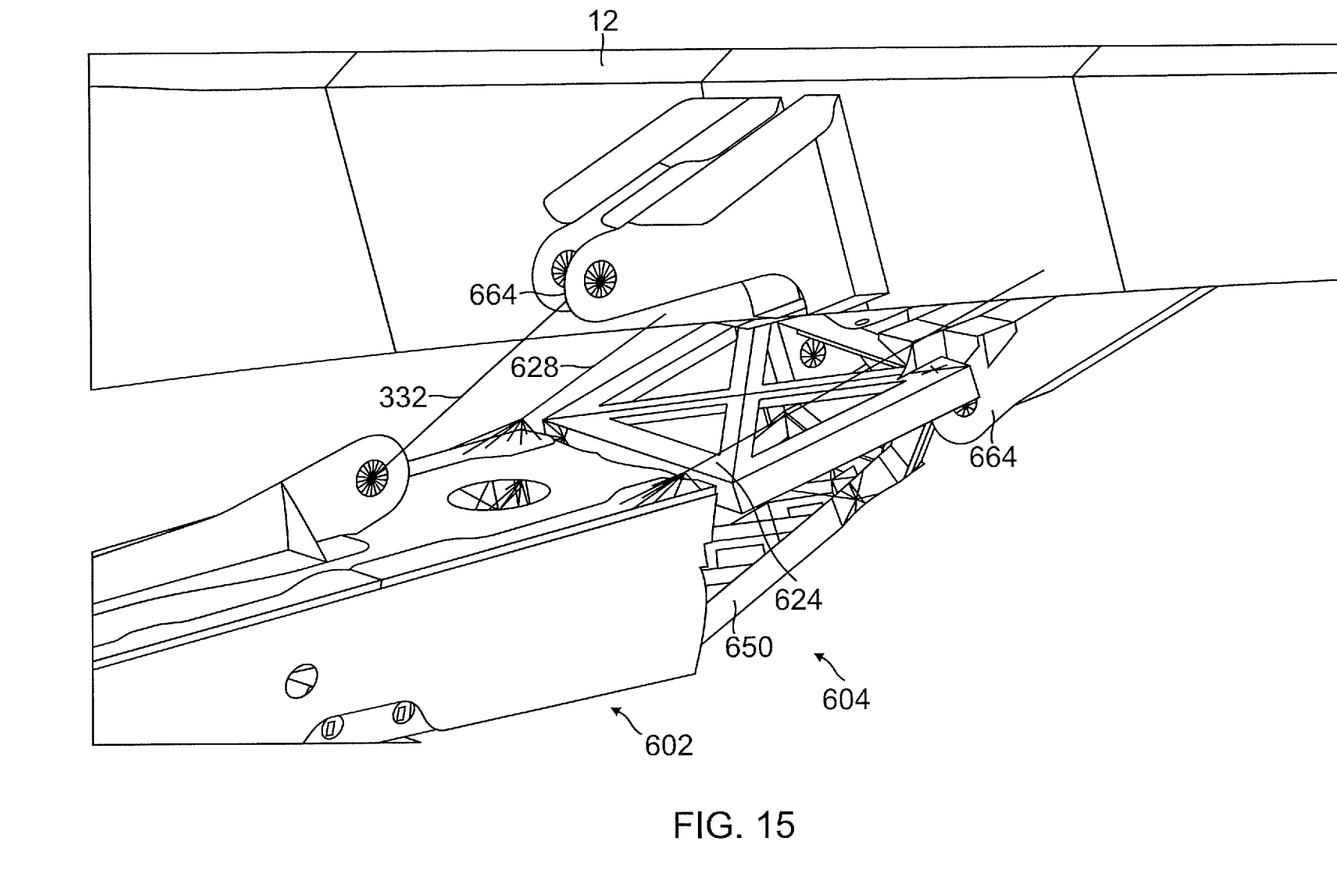
FIG. 15 is partial upper and left side perspective view of the example engine mounting strut.
Figure 16:
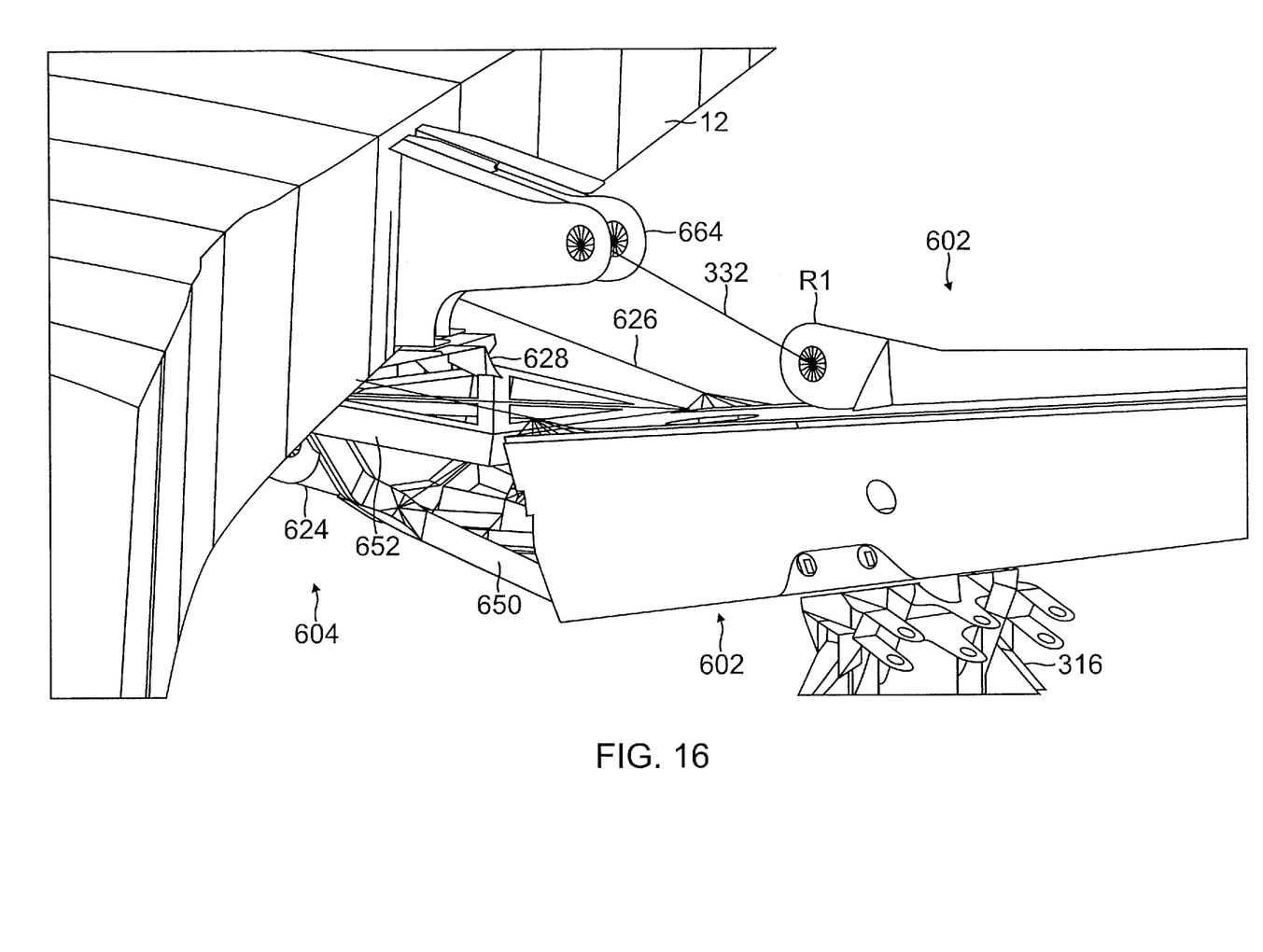
FIG. 16 is another partial right side perspective view of the example engine mounting strut.
Figure 17:
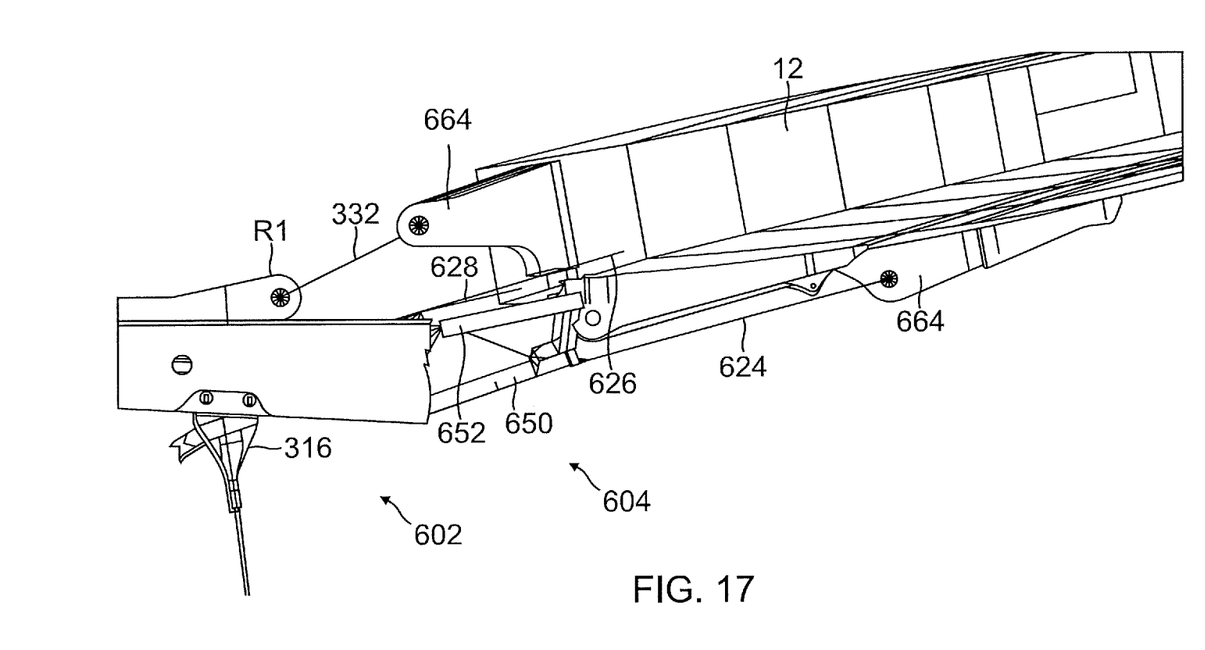
FIG. 17 is another partial left side elevation view of the example engine mounting strut; and, FIG. 18 is another partial left side perspective view of the example engine mounting strut.
Figure 18:
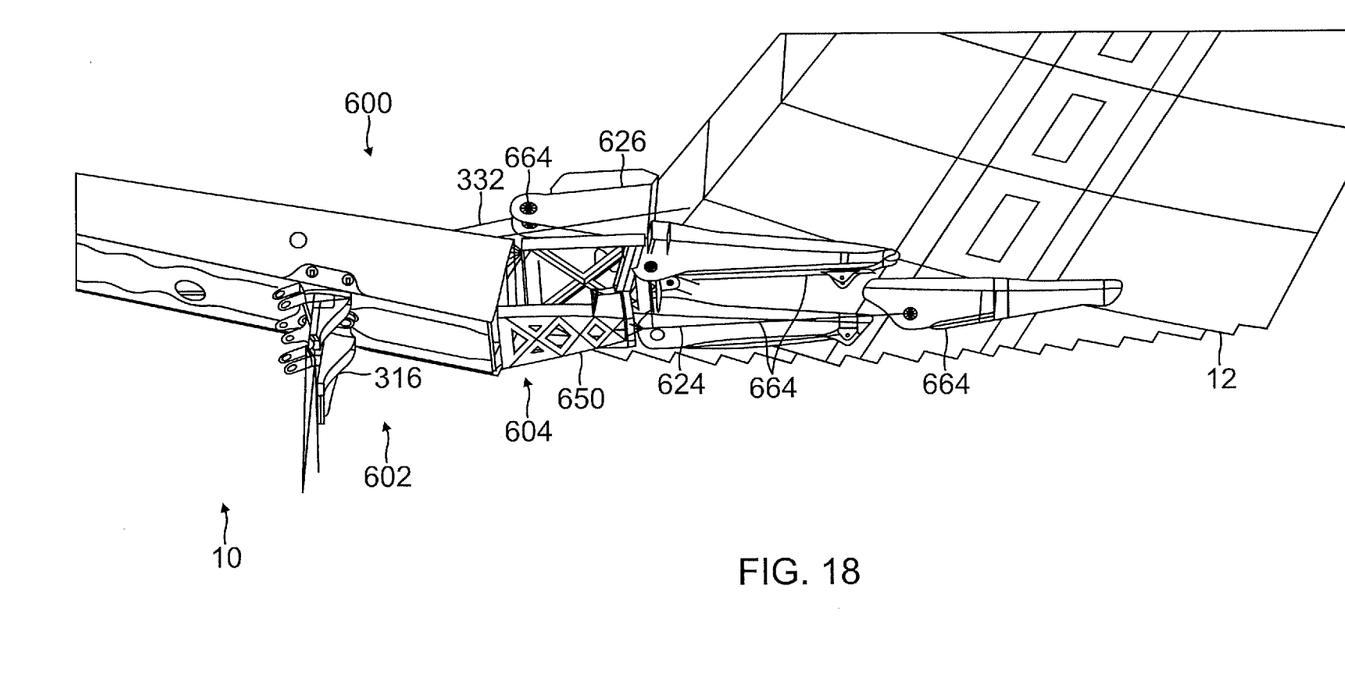

FIG. 15 is partial upper and left side perspective view of the truss 600 of the example engine mounting strut 22. FIG. 16 is another partial right side perspective view of the truss 600 of the example engine mounting strut 22. FIG. 17 is another partial left side elevation view of the truss 600 of the example engine mounting strut 22, and FIG. 18 is another partial left side perspective view of the truss of the example engine mounting strut 22.

The example redesigned truss 600 has a total weight that is only slightly heavier, e.g. about 9 lbs., than the conventional truss 300, assuming that it comprises a steel alloy components and depending on the manner in which the aft end portion 604 of the truss 600 is fabricated. For example, if the upper frame 652 is fabricated as a single piece, e.g., by machining, rather than as, e.g., a weldment of the individual parts described above in connection with FIGS. 11C-11D this can result in a total weight for the redesigned truss 600 that is about 25 lbs. less than that of the conventional truss 300.

Indeed, as those of some skill will by now appreciate, and depending on the specific application at hand, many modifications, substitutions and variations can be made in and to the materials, apparatus, configurations and design methods of the jet engine mounting struts of present disclosure without departing from its spirit and scope. In light of this, the scope of the present invention should not be limited to those of the particular embodiments illustrated and described herein, as they are merely by way of some examples thereof, but rather, should be fully commensurate with that of the claims appended hereafter and their functional equivalents.

What is claimed is:

1. A strut for mounting a jet engine to a wing of an aircraft, the strut comprising:
    a plurality of engine mounts; and
    a space frame truss supported from the wing and comprising a front portion and an aft portion, the front portion being coupled to and supporting the engine mounts, the aft portion extending upwardly and rearwardly from an aft end of the front portion,
    wherein the aft portion of the space frame truss comprises:
        a lower frame having an aft end;
        an upper frame having an aft end; and
        a U-shaped aft frame disposed at an aft end of the aft portion and coupling the aft end of the lower frame to the aft end of the upper frame; and
    wherein the upper frame comprises:
        a rectangular frame comprising four chords coupled end-to-end at corners of the rectangular frame;
        an upper skin disposed on an upper surface of the rectangular frame, the upper skin defining an X-shaped pattern extending between diagonal corners of the rectangular frame; and
        a pair of stiffeners disposed on an upper surface of the upper skin and forming a cross extending between the diagonal corners of the rectangular frame.

2. The strut of claim 1, wherein the aft portion extends upwardly and rearwardly from the aft end of the front portion such that no part of the aft portion is disposed within a core exhaust zone of the jet engine.

3. The strut of claim 1, wherein the aft portion extends upwardly and rearwardly from a transverse plane of the space frame truss that is substantially coplanar with a core exit plane of the jet engine.

4. An aircraft comprising the strut of claim 1, wherein the jet engine comprises a turbofan engine.

5. The strut of claim 1, wherein a front end of the upper frame is coupled to an aft end of an upper frame of the front portion, and a front end of the lower frame is coupled to an aft end of a lower frame of the front portion.

6. The strut of claim 5, further comprising a plurality of transverse frames distributed between front and aft ends of the front portion.

7. The strut of claim 1, wherein the plurality of engine mounts comprise:
    a front engine mount dependent from a first bulkhead disposed at a front end of the front portion; and
    an aft engine mount dependent from a second bulkhead disposed between the first bulkhead and the aft end of the front portion.

8. The strut of claim 1, wherein the jet engine is surrounded by a streamlining nacelle, and further comprising a streamlining fairing disposed over the strut between the streamlining nacelle and a lower surface of the wing.

9. A method for mounting an engine to a wing of an aircraft, the method comprising:
    supporting a space frame truss from the wing, the space frame truss comprising front and aft portions, the front portion having a plurality of engine mounts dependent therefrom, the aft portion extending upwardly and rearwardly from an aft end of the front portion; and
    coupling the engine to the engine mounts,
    wherein the aft portion of the space frame truss comprises:
        a lower frame having an aft end;
        an upper frame having an aft end; and
        a U-shaped aft frame disposed at an aft end of the aft portion and coupling the aft end of the lower frame to the aft end of the upper frame; and wherein the upper frame comprises:
- a rectangular frame comprising four chords coupled end-to-end at corners of the rectangular frame;
- an upper skin disposed on an upper surface of the rectangular frame, the upper skin defining an X-shaped pattern extending between diagonal corners of the rectangular frame; and
- a pair of stiffeners disposed on an upper surface of the upper skin and forming a cross extending between the diagonal corners of the rectangular frame.

10. The method of claim 9, wherein the engine comprises a jet engine, and wherein the supporting comprises configuring the space frame truss such that no part of the aft portion is disposed within a core exhaust zone of the engine.

11. The method of claim 10, wherein the engine comprises a turbofan engine, and wherein the supporting comprises configuring the space frame truss such that at least part of the aft portion is disposed within a fan exhaust zone of the engine.

12. The method of claim 9, wherein the supporting comprises coupling the front portion to the wing by a first link and coupling the aft portion to the wing by second, third and fourth links.

13. The method of claim 12, wherein the second link comprises a primary load path for transferring a thrust of the engine into the wing.

14. An aircraft, comprising:
- a fuselage;
- a wing coupled to the fuselage;
- an engine mounting strut supported from the wing, the engine mounting strut having an aft portion that extends upwardly and rearwardly from a transverse plane of the engine mounting strut; and
- a jet engine supported from the engine mounting strut;

wherein no part of the aft portion of the engine mounting strut is disposed within a core exhaust zone of the engine;

wherein the aft portion comprises:
- a lower frame having an aft end;
- an upper frame having an aft end; and
- a U-shaped aft frame disposed at an aft end of the aft portion and coupling the aft end of the lower frame to the aft end of the upper frame; and wherein the upper frame comprises:
- a rectangular frame comprising four chords coupled end-to-end at corners of the rectangular frame;
- an upper skin disposed on an upper surface of the rectangular frame, the upper skin defining an X-shaped pattern extending between diagonal corners of the rectangular frame; and
- a pair of stiffeners disposed on an upper surface of the upper skin and forming a cross extending between the diagonal corners of the rectangular frame.

15. The aircraft of claim 14, wherein the aft portion of the engine mounting strut is substantially coplanar with a core exit plane of the jet engine.

16. The aircraft of claim 14, wherein the jet engine comprises a turbojet engine, a low-bypass turbofan engine or a high-bypass turbofan engine.

17. The aircraft of claim 14, further comprising a first link coupling a front portion of the engine mounting strut to the wing, and second, third and fourth links coupling the aft portion of the engine mounting strut to the wing.

18. The aircraft of claim 14, further comprising:
- a streamlining nacelle surrounding the jet engine; and
- a streamlining fairing disposed over the engine mounting strut between the streamlining nacelle and a lower surface of the wing.

* * * * *